United States Patent [19]
Pekala et al.

[11] Patent Number: 6,092,932
[45] Date of Patent: Jul. 25, 2000

[54] REUSABLE GIFT BAG

[76] Inventors: Debra J. Pekala, 494 Jeffreys Dr.; Mary Jo Gacovsky, 207 Highland Dr., both of Elizabeth, Pa. 15037

[21] Appl. No.: 09/345,854

[22] Filed: Jul. 1, 1999

[51] Int. Cl.⁷ .................................................... B65D 33/28
[52] U.S. Cl. .................................. 383/75; 40/6; 206/575; 383/127; D9/305
[58] Field of Search .................................. 383/71, 72, 73, 383/74, 75, 76, 127; 40/124.08, 6; 206/575; D9/305

[56] References Cited

U.S. PATENT DOCUMENTS

| | | | |
|---|---|---|---|
| D. 135,446 | 4/1943 | Karoff | D9/305 |
| D. 349,450 | 8/1994 | Wales | D9/305 |
| 1,382,394 | 6/1921 | Spurgin | 383/71 |
| 1,706,330 | 3/1929 | Sorg | 383/75 |
| 2,452,098 | 10/1948 | Brooks | 383/71 |
| 2,678,672 | 5/1954 | Spilman | 383/73 |
| 2,863,365 | 12/1958 | Piazze | 383/75 |
| 4,294,350 | 10/1981 | Haase et al. | 383/71 |
| 4,757,901 | 7/1988 | Woods | 206/575 |
| 4,777,066 | 10/1988 | White et al. | 383/76 |
| 5,024,332 | 6/1991 | Stachler | 206/575 |
| 5,161,895 | 11/1992 | Myers | 383/75 |
| 5,186,499 | 2/1993 | Mason | 283/81 |
| 5,186,988 | 2/1993 | Dixon | 383/71 |

FOREIGN PATENT DOCUMENTS

| | | | |
|---|---|---|---|
| 251440 | 1/1927 | Italy | 383/71 |
| 68577 | 1/1927 | Switzerland | 383/71 |
| 1112769 | 5/1968 | United Kingdom | 383/71 |

*Primary Examiner*—Stephen P. Garbe

[57] ABSTRACT

A reusable gift bag for holding a gift therein and which can be used again after the gift has been removed. The reusable gift bag includes a bag with an opening therein, and a peripheral sleeve around an outer periphery of the opening. The peripheral sleeve has a break therein defining a pair of opposing open ends. At least one flexible elongate element is extended through the peripheral sleeve for constricting the opening of the bag. The elongate element has a pair of opposite ends outwardly extending from the break in the peripheral sleeve. A writing instrument is coupled to one end of the elongate elements. A reusable tag is coupled to the other end of the elongate element. The reusable tag has an exterior surface designed for permitting wiping off of marks formed thereon by the writing instrument in order to clean the exterior surface of the reusable tag for repeated use of the reusable tag.

4 Claims, 1 Drawing Sheet

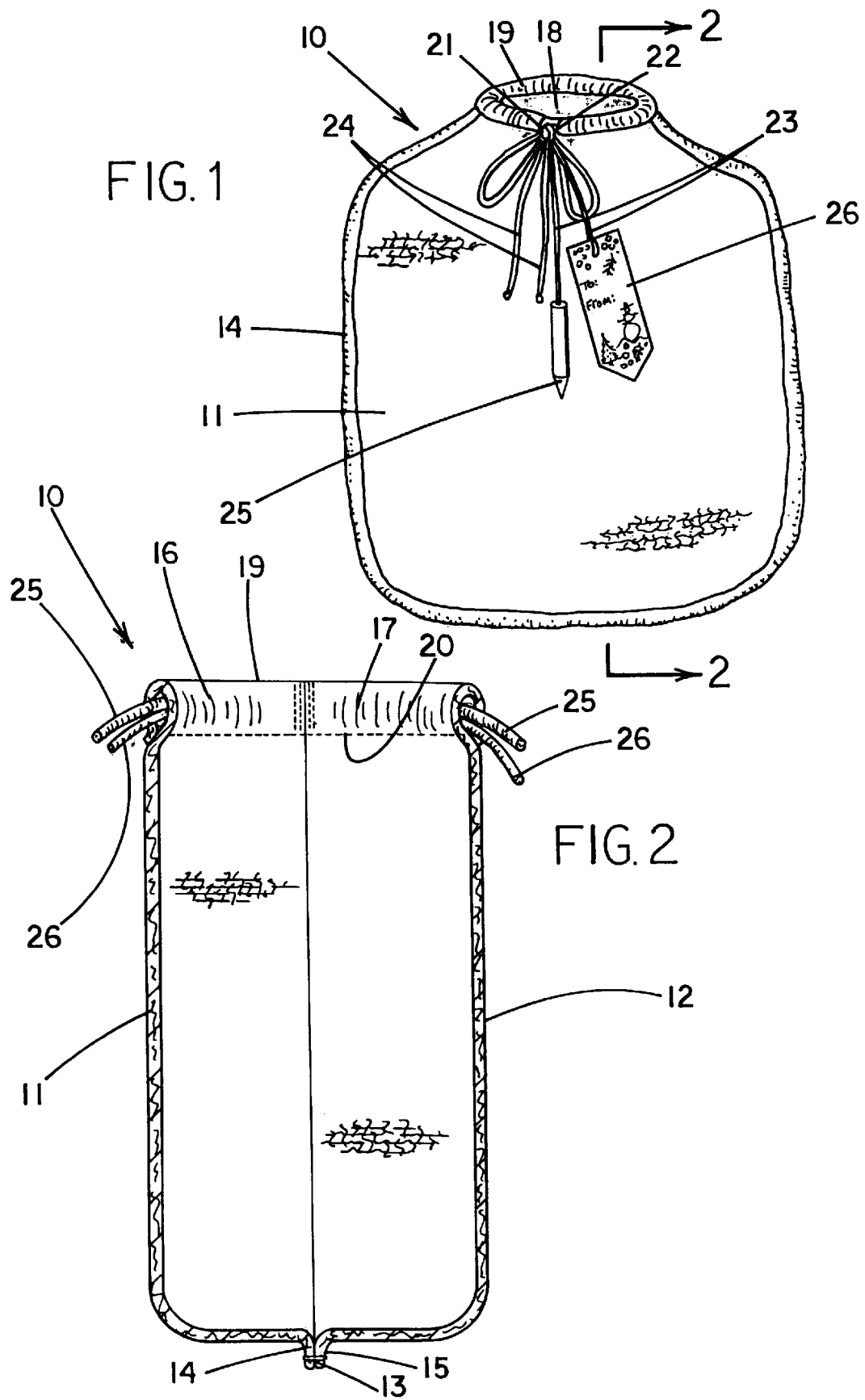

REUSABLE GIFT BAG

BACKGROUND OF THE INVENTION

1. Field of the Invention

The present invention relates to gift bags and more particularly pertains to a new reusable gift bag for holding a gift therein and which can be used again after the gift has been removed.

2. Description of the Prior Art

The use of gift bags is known in the prior art. More specifically, gift bags heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 1,832,394; U.S. Pat. No. Des. 172,420; U.S. Pat. No. Des. 261,075; U.S. Pat. No. Des. 350,475; U.S. Pat. No. 1,683,678; and U.S. Pat. No. Des. 220,414.

While these devices fulfill their respective, particular objectives and requirements, the aforementioned patents do not disclose a new reusable gift bag. The inventive device includes a bag with an opening therein, and a peripheral sleeve around an outer periphery of the opening. The peripheral sleeve has a break therein defining a pair of opposing open ends. At least one flexible elongate element is extended through the peripheral sleeve for constricting the opening of the bag. The elongate element has a pair of opposite ends outwardly extending from the break in the peripheral sleeve. A writing instrument is coupled to one end of the elongate elements. A reusable tag is coupled to the other end of the elongate element. The reusable tag has an exterior surface designed for permitting wiping off of marks formed thereon by the writing instrument in order to clean the exterior surface of the reusable tag for repeated use of the reusable tag.

In these respects, the reusable gift bag according to the present invention substantially departs from the conventional concepts and designs of the prior art, and in so doing provides an apparatus primarily developed for the purpose of holding a gift therein and which can be used again after the gift has been removed.

SUMMARY OF THE INVENTION

In view of the foregoing disadvantages inherent in the known types of gift bags now present in the prior art, the present invention provides a new reusable gift bag construction wherein the same can be utilized for holding a gift therein and which can be used again after the gift has been removed.

The general purpose of the present invention, which will be described subsequently in greater detail, is to provide a new reusable gift bag apparatus and method which has many of the advantages of the gift bags mentioned heretofore and many novel features that result in a new reusable gift bag which is not anticipated, rendered obvious, suggested, or even implied by any of the prior art gift bags, either alone or in any combination thereof.

To attain this, the present invention generally comprises a bag with an opening therein, and a peripheral sleeve around an outer periphery of the opening. The peripheral sleeve has a break therein defining a pair of opposing open ends. At least one flexible elongate element is extended through the peripheral sleeve for constricting the opening of the bag. The elongate element has a pair of opposite ends outwardly extending from the break in the peripheral sleeve. A writing instrument is coupled to one end of the elongate elements. A reusable tag is coupled to the other end of the elongate element. The reusable tag has an exterior surface designed for permitting wiping off of marks formed thereon by the writing instrument in order to clean the exterior surface of the reusable tag for repeated use of the reusable tag.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new reusable gift bag apparatus and method which has many of the advantages of the gift bags mentioned heretofore and many novel features that result in a new reusable gift bag which is not anticipated, rendered obvious, suggested, or even implied by any of the prior art gift bags, either alone or in any combination thereof.

It is another object of the present invention to provide a new reusable gift bag which may be easily and efficiently manufactured and marketed.

It is a further object of the present invention to provide a new reusable gift bag which is of a durable and reliable construction.

An even further object of the present invention is to provide a new reusable gift bag which is susceptible of a low cost of manufacture with regard to both materials and labor, and which accordingly is then susceptible of low prices of sale to the consuming public, thereby making such reusable gift bag economically available to the buying public.

Still yet another object of the present invention is to provide a new reusable gift bag which provides in the apparatuses and methods of the prior art some of the advantages thereof, while simultaneously overcoming some of the disadvantages normally associated therewith.

Still another object of the present invention is to provide a new reusable gift bag for holding a gift therein and which can be used again after the gift has been removed.

Yet another object of the present invention is to provide a new reusable gift bag which includes a bag with an opening therein, and a peripheral sleeve around an outer periphery of the opening. The peripheral sleeve has a break therein defining a pair of opposing open ends. At least one flexible elongate element is extended through the peripheral sleeve for constricting the opening of the bag. The elongate element has a pair of opposite ends outwardly extending from the break in the peripheral sleeve. A writing instrument is coupled to one end of the elongate elements. A reusable tag is coupled to the other end of the elongate element. The reusable tag has an exterior surface designed for permitting wiping off of marks formed thereon by the writing instrument in order to clean the exterior surface of the reusable tag for repeated use of the reusable tag.

Still yet another object of the present invention is to provide a new reusable gift bag that may be made of a washable fabric material so that it can be washed and cleaned after each use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of the exterior of a reusable gift bag according to the present invention.

FIG. 2 is a schematic cross sectional view of the present invention taken from line 2—2 of FIG. 1.

DESCRIPTION OF THE PREFERRED EMBODIMENT

With reference now to the drawings, and in particular to FIGS. 1 through 2 thereof, a new reusable gift bag embodying the principles and concepts of the present invention will be described.

As best illustrated in FIGS. 1 through 2, the reusable gift bag generally comprises a bag with an opening therein, and a peripheral sleeve around an outer periphery of the opening. The peripheral sleeve has a break therein defining a pair of opposing open ends. At least one flexible elongate element is extended through the peripheral sleeve for constricting the opening of the bag. The elongate element has a pair of opposite ends outwardly extending from the break in the peripheral sleeve. A writing instrument is coupled to one end of the elongate element. A reusable tag is coupled to the other end of the elongate element. The reusable tag has an exterior surface designed for permitting wiping off of marks formed thereon by the writing instrument in order to clean the exterior surface of the reusable tag for repeated use of the reusable tag.

In closer detail, the gift bag comprises a flexible bag 10 defining an interior space and which is formed by a pair of flexible panels 11,12 coupled together along outer perimeters thereof. The panels each comprise a woven fabric material that is washable for cleaning. The outer perimeters of the panels may be coupled together by stitching 13 with each outer perimeter having an outwardly folded lip portion 14,15 abutting that of the other panel through which the stitching is extended.

The outer perimeters of the panels have adjacent uncoupled portions 16,17 defining an outer periphery of an opening 18 into the interior space of the bag. As best illustrated in FIG. 2, the uncoupled portions of the panels each are folded over and coupled to an adjacent region of the respective panel to form a peripheral sleeve 19 around the outer periphery of the opening into the interior space of the bag. The uncoupled portions of the panels each may be coupled to the adjacent region of the respective panel by a row of stitching 20 extending therealong to form the peripheral sleeve.

Each uncoupled portion forms an elongate segment of the peripheral sleeve with each elongate segment having a pair of opposite ends located adjacent opposite sides of the coupled together portions of the outer perimeters of the panels. Each end of each elongate segment is coupled to an adjacent corresponding end of the other elongate segment such that the elongate segments are in communication with each other and form the peripheral sleeve.

As best illustrated in FIG. 1, the peripheral sleeve has a break therein located adjacent one of the panels. The break defines a pair of opposing open ends 21,22 of the peripheral sleeve.

A pair of flexible elongate elements 23,24 are extended through the peripheral sleeve for constricting the opening of the bag. The elongate elements each have a pair of opposite ends outwardly extending from the break in the peripheral sleeve, one of the ends of each elongate element is outwardly extended from one open end of the peripheral sleeve and the other of the ends of each elongate element is outwardly extended through the other open end of the peripheral sleeve.

As illustrated in FIG. 1, the ends of the elongate elements are tied together for holding the opening of the bag in a constricted configuration.

A writing instrument 25 is coupled to one end of a first of the elongate elements. A reusable tag 26 is coupled to the other end of the first elongate element. The reusable tag has an exterior surface designed for permitting wiping off of markings formed thereon by the writing instrument in order to clean the exterior surface of the reusable tag for repeated use of the reusable tag.

In one embodiment, the exterior surface of the reusable tag may comprise a smooth plastic material or have an plastic outer coating such as a clear plastic lamination to form the exterior surface of the reusable tag. The writing instrument may comprise a wax pencil or an washable ink pen for which marks made thereby on the exterior surface of the reusable may be wiped off to erase the marks.

The bag is also reversible so that each surface of the panels may have different designs thereon so that one single bag can be configured to look like two separately versions depending on which face of the panels is exposed on the exterior of the bag. The bag also may come in a variety of dimensions including for example: small—17" by 12"; medium—2'6" by 2'10"; and large—4'10" by 4' to hold a variety of different sized gifts therein.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A gift bag, comprising:
   a bag having an opening therein, and a peripheral sleeve around an outer periphery of said opening;
   said peripheral sleeve having a break therein defining a pair of opposing open ends;
   at least one flexible elongate element being extended through said peripheral sleeve for constricting said opening of said bag, said elongate element having a pair of opposite ends outwardly extending from said break in said peripheral sleeve;
   a writing instrument being coupled to one end said elongate element; and
   a reusable tag being coupled to the other end of said elongate element, said reusable tag having an exterior surface adapted for permitting wiping off of marks formed thereon by said writing instrument in order to clean said exterior surface of said reusable tag for repeated use of said reusable tag.

2. The gift bag of claim 1, wherein said bag comprises a pair of panels coupled together along outer perimeters thereof, wherein said outer perimeters of said panels have adjacent uncoupled portions defining said outer periphery of said opening of said bag.

3. The gift bag of claim 2, wherein said uncoupled portions of said panels each are folded over and coupled to an adjacent region of the respective panel to form said peripheral sleeve.

4. A gift bag, comprising:
   a flexible bag defining an interior space and comprising a pair of flexible panels coupled together along outer perimeters thereof;
   said panels each comprising a woven fabric material;
   said outer perimeters of said panels having adjacent uncoupled portions defining an outer periphery of an opening into said interior space of said bag;
   said uncoupled portions of said panels each being folded over and coupled to an adjacent region of the respective panel to form a peripheral sleeve around said outer periphery of said opening into said interior space of said bag;
   each uncoupled portion forming an elongate segment of said peripheral sleeve, each elongate segment having a pair of opposite ends located adjacent opposite sides of the coupled together portions of said outer perimeters of said panels;
   each end of each elongate segment being coupled to an adjacent corresponding end of the other elongate segment such that said elongate segments are in communication with each other and form said peripheral sleeve;
   said peripheral sleeve having a break therein located adjacent one of said panels, said break defining a pair of opposing open ends of said peripheral sleeve;
   a pair of flexible elongate elements being extended through said peripheral sleeve for constricting said opening of said bag;
   said elongate elements each having a pair of opposite ends outwardly extending from said break in said peripheral sleeve, one of said ends of each elongate element being outwardly extended from one open end of said peripheral sleeve and the other of said ends of each elongate element being outwardly extended through the other open end of said peripheral sleeve;
   said ends of said elongate elements being tied together for holding said opening of said bag in a constricted configuration;
   a writing instrument being coupled to one end of a first of said elongate elements;
   a reusable tag being coupled to the other end of said first elongate element, said reusable tag having an exterior surface adapted for permitting wiping off of writing formed thereon by said writing instrument in order to clean said exterior surface of said reusable tag for repeated use of said reusable tag; and
   said exterior surface of said reusable tag comprising a plastic material and said writing instrument comprising a wax pencil for which marks made thereby on the exterior surface of said reusable may be wiped off to erase the marks.

* * * * *